United States Patent
Hiraga

[11] 4,425,520
[45] Jan. 10, 1984

[54] REDUCED DIAMETER DEVICES WITH AN ELECTROMAGNETIC CLUTCH

[75] Inventor: Masaharu Hiraga, Isesaki, Japan

[73] Assignee: Sankyo Electric Company Limited, Gunma, Japan

[21] Appl. No.: 358,926

[22] Filed: Mar. 17, 1982

Related U.S. Application Data

[63] Continuation of Ser. No. 107,436, Dec. 26, 1979, abandoned.

[30] Foreign Application Priority Data

Dec. 25, 1978 [JP] Japan ............................. 53-162320
Jan. 12, 1979 [JP] Japan ............................... 54-2732

[51] Int. Cl.³ ............................................ F16D 13/62
[52] U.S. Cl. ................................. 310/92; 192/84 C; 308/236; 310/78; 310/89
[58] Field of Search ............. 192/84 C, 84 T; 310/78, 310/89, 92; 308/189 R, 190, 191, 216, 236

[56] References Cited

U.S. PATENT DOCUMENTS

| Re. 15,187 | 9/1921 | Reynolds | 308/236 |
| 1,669,725 | 4/1928 | Scribner | 308/189 R |
| 3,066,000 | 11/1962 | James et al. | 308/236 |
| 4,150,738 | 4/1979 | Sayo et al. | 192/84 C |
| 4,273,226 | 6/1981 | Takefuta et al. | 192/35 |

Primary Examiner—J. D. Miller
Assistant Examiner—D. L. Rebsch
Attorney, Agent, or Firm—Hopgood, Calimafde, Kalil, Blaustein & Judlowe

[57] ABSTRACT

A device with an electromagnetic clutch includes a tubular member of steel which is secured to, and cantilevered by, a flange member secured to a housing of the device. A pulley having magnetic pole faces is rotatably mounted on the tubular member by one or more bearings. A drive shaft of the device extends out of the housing and through the tubular member, and supports a magnetic armature on the extended end. An electromagnet associating with the pulley is fixedly supported on the flange member to supply magnetic attraction force for attracting the armature plate to the pulley. In the arrangement, since the wall thickness of the tubular member is made thin, the outer diameter of the clutch can be reduced without degrading the transmission of rotational force. And a shaft seal assembly can be mounted on the drive shaft within the tubular member. Furthermore, the inner ring of the bearing is held between the flange member and a retaining ring fitted onto the tubular member, to be prevented from axial movement. In order to prevent the inner ring from rotating, the inner ring is locked to the flange member by connection of projections and mating depressions formed thereto. Thus, the assembling operation of the electromagnetic clutch is simplified.

8 Claims, 8 Drawing Figures

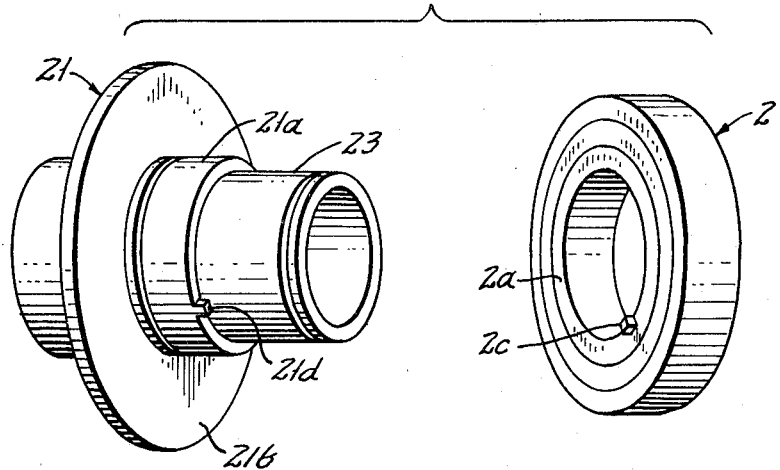
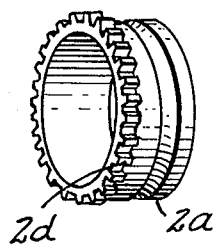
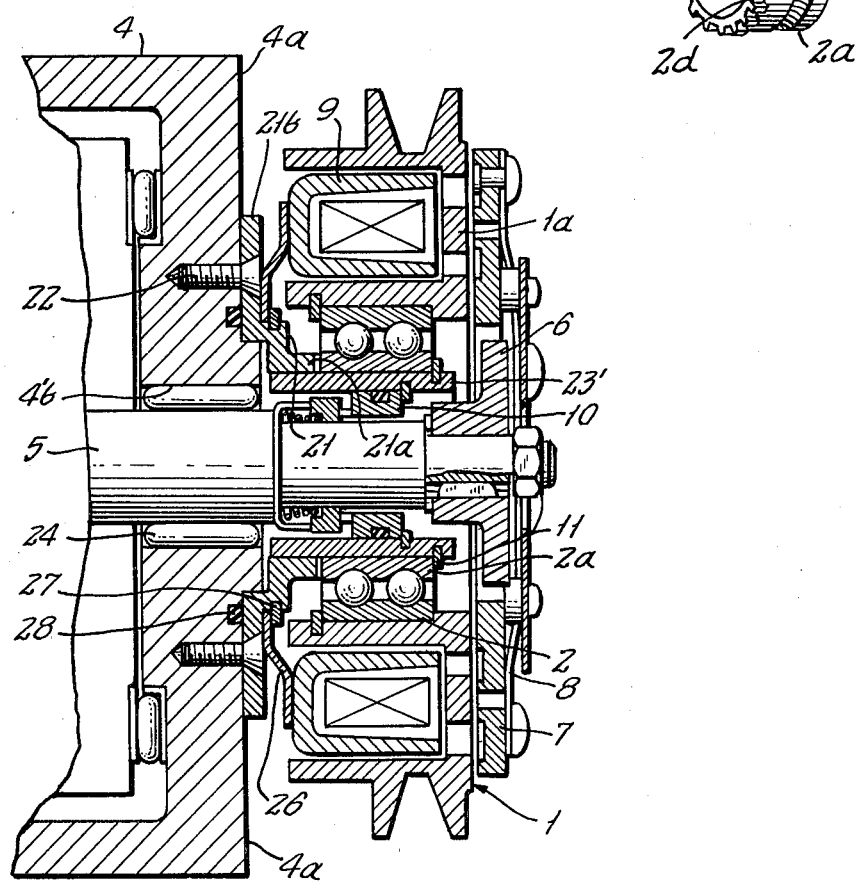

REDUCED DIAMETER DEVICES WITH AN ELECTROMAGNETIC CLUTCH

This is a continuation, of application Ser. No. 107,436 filed Dec. 26, 1979 now abandon.

BACKGROUND OF THE INVENTION

This invention relates to electromagnetic clutches and, in particular, to clutches for use in driving refrigerant compressors for automobile air conditioning systems.

FIG. 1 illustrates a known electromagnetic clutch which is used between the engine and the compressor for selectively driving the compressor. The clutch includes a pulley 1 which is mounted on a bearing 2 mounted on a tubular bearing support or sleeve 3 of a compressor housing 4 and which is rotated by a belt shown by a dotted line from the automobile engine (not shown). Pulley 1 is provided with a plurality of concentric annular magnetic pole faces 1a at an axial end thereof. A drive shaft 5 of the compressor extends through sleeve 3. A hub 6 is fixed to the extending terminal end of drive shaft 5, and an annular armature plate 7 is joined by leaf springs 8 to hub 6 so that armature plate 7 faces the annular concentric pole faces with an axial space therebetween. An electromagnet 9 is mounted on sleeve 3, and is stationarily disposed within an annular hollow portion formed in pulley 1 to supply magnetic flux for attracting armature plate 7 to magnetic pole faces 1a.

Thus, when electromagnet 9 is energized, drive shaft 5 is rotated together with pulley 1 by the engine output, and when electromagnet 9 is not energized, pulley 1 is rotated by the engine but the compressor is not driven.

In the known electromagnetic clutch, since tubular bearing support or sleeve 3 is made integral with compressor housing 4, the wall thickness of sleeve 3 is relatively thick for the readiness of the production. In case compressor housing 4 is made of aluminum or aluminum alloy to reduce the weight of the compressor, the wall thickness of sleeve 3 is increased to obtain the mechanical strength of the sleeve sufficient to resist to the tension of the belt wound on pulley 1. Therefore, the diameter of pulley 1 is increased so that the compressor with the electromagnetic clutch becomes large, while it results in the reduction of the magnetic attraction force to reduce only the outer diameter of the pulley, so that the transmission of the rotation is degraded.

A shaft seal assembly 10 is usually disposed on drive shaft 5 within sleeve 3. Therefore, the inner diameter of sleeve 3 is required large enough to contain the shaft seal assembly in the sleeve. Accordingly, the outer diameter of the sleeve and, therefore, the diameter of the pulley are increased.

In the known arrangement shown in FIG. 1, bearing 2 is fixedly mounted on sleeve 3 by fitting the inner ring 2a on sleeve 3 and securing a retainer ring or a snap ring 11 on the outer surface of sleeve 3. Inner ring 2a is held between a shoulder portion 3a formed on sleeve portion and retainer ring 11 to be prevented from its axial movement. Although the rotation of inner ring 2a on sleeve 3 can be prevented by closely fitting inner ring 2a onto sleeve 3, the assembling operation of bearing 2 on sleeve 3 is difficult. Furthermore, once the rotation of inner ring 2a is caused on sleeve 3 for any reason, it cannot be repaired.

In another known arrangement, the sleeve is made integral with a bracket for supporting the electromagnet. Referring to FIG. 2, a bracket 12 is secured onto compressor housing 4 by screws 13, electromagnet 9 is fixedly supported by bracket 12. Bracket 12 has an integral sleeve portion 12a surrounding drive shaft 5. On sleeve portion 12a, bearing 2 is mounted which supports pulley 1.

In the arrangement, since bracket is made of steel and, therefore, the wall thickness of sleeve portion 12a can be thin, the diameter of the pulley can be reduced without degrading the transmission of the rotational force. Furthermore, in the arrangement shown in FIG. 2, since no shaft assembly is mounted within sleeve portion 12a, the outer diameter of the sleeve portion is further reduced. But, the shaft seal assembly must be assembled in the compressor housing, and this makes it difficult to repair the shaft seal assembly.

In the known arrangement shown in FIG. 2, a complex construction is employed to fixedly mount inner ring 2a of bearing 2 onto sleeve portion 12a.

Referring to FIG. 3 in addition to FIG. 2, a shoulder 12b is formed on sleeve portion 12a. Sleeve portion 12a is provided with a threaded groove 14 on the outer surface of its extended end, and with axial slits 15 in its extended end. After fitting inner ring 2a on sleeve portion 12a, a washer ring 16 is fitted on sleeve portion 12a and, thereafter, a nut 17 is threaded on extended end of sleeve portion 12a. Inner ring 2a is pushed to shoulder 12b by tightening nut 17 and is tightly held between shoulder 12b and washer ring 16, so that it is prevented from not only its axial movement but also rotation. In order to prevent nut 17 from loosing, washer ring 16 is provided with radially inwardly projecting projections 16a which are fitted in axial slits 15 to prevent the rotation of washer ring 16. Washer ring 16 is also provided with a plurality of radial outer projections 16b, while nut 17 is provided with a plurality of axial grooves 17a on its outer surface. After tightening nut 17, outer projections 16b are bent to engage with axial grooves 17a, so that nut 17 is prevented from loosing.

The arrangement is complex but is not so sufficient to prevent the inner ring of the bearing from rotating because the preventing force is merely due to the contact force of the inner ring with the washer ring and the shoulder.

SUMMARY OF THE INVENTION

It is an object of this invention to provide a device with an electromagnetic clutch mounted on it, wherein the diameter of a pulley is made small and, therefore, the electromagnetic clutch is made compact without any degradation of the rotational transmission.

It is another object of this invention to provide a device with an electromagnetic clutch wherein bearing means supporting the pulley is fixedly mounted on a bearing support with neither axial movement nor rotation.

It is still another object of this invention to provide a device with an electromagnetic clutch wherein the bearing support rotatably supporting the pulley is a sleeve member secured to the device and having a thin wall thickness so that the diameter of the pulley may be reduced, while a shaft seal assembly being assembled within the sleeve.

It is yet another object of this invention to provide a device with an electromagnetic clutch which is simple in the construction and the production, with realizing above described objects.

A device with an electromagnetic clutch according to this invention includes a housing of the device and a drive shaft extending out of, and rotatably mounted on, the housing. A flange member is secured onto the housing and a tubular member is secured to, and cantilevered by the flange member. The tubular member surrounds the drive shaft. On the tubular member, first bearing means are mounted which supports a pulley. An armature plate is secured to and mounted on the drive shaft to face the pulley with an axial gap therebetween. An electromagnet is fixedly supported on the flange member to associate with the pulley. Within the tubular member, a shaft seal assembly is mounted on the drive shaft.

The inner ring of the first bearing means is locked to the axial end of the flange member to prevent the inner ring from rotating by engagement of axial projections formed on the inner ring and the flange member. A retainer ring is fixed on the tubular member to prevent the axial movement of the inner ring in cooperating with the flange member.

In a preferred aspect, the inner end of the tubular member is fitted into an aperture of the housing through which the drive shaft extends, and second bearing means are supported on the tubular member to rotatably support the drive shaft.

Further objects, features and other aspects of this invention will be understood from the following detailed description of preferred embodiments referring to the annexed drawings.

BRIEF D

FIG. 6 is a perspective view similar to FIG. 5, of a modified embodiment;

FIG. 7 is a perspective view of another modified embodiment; and

FIG. 8 is a sectional view of another embodiment of this invention.

DETAILED DESCRIPTION OF PREFERRED EMBODIMENTS

Briefly stated, this invention attempts to support a rigid tubular sleeve of thin wall thickness by a radial flange member secured to a housing of a device, to reduce the diameter of a pulley mounted on the sleeve, and to lock an inner ring of a bearing for supporting the pulley with a shoulder or an axial end of the radial flange member to prevent the inner ring from rotating on the tubular member.

Figure 4:
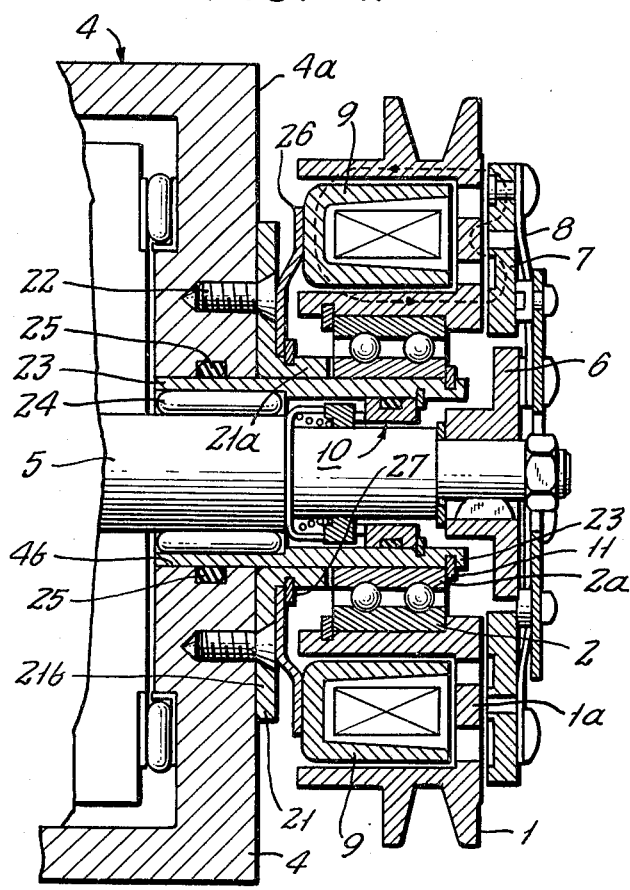
FIG. 4 is a sectional view of an embodiment of this invention.

Referring to FIG. 4, an embodiment shown therein is characterized in that a flange member 21 is secured onto aluminum or aluminum alloy housing 4 of a device or a compressor by screws 22 with a tubular member 23 fixedly supported by flange member 21.

Flange member 21 comprises a short cylindrical portion 21a and a radial flange portion 21b connected to an axial end of cylindrical portion 21a. Radial flange portion 21b is contacted on the front surface 4a of compressor housing 4 and secured by screws 22. Tubular member 23 is fitted into an aperture 4b of housing 4 at an end, and supports a radial needle bearing 24 therein. Tubular member 23 is also fitted into cylindrical portion 21b and secured thereto by, for example, welding. Thus, tubular member 23 is strongly supported by compressor housing 4 and flange member 21.

Drive shaft 5 is rotatably supported by radial needle bearing 24 and extends in tubular member 23 to project beyond the axial end of tubular member 23.

Shaft seal assembly 10 is disposed on drive shaft 5 within tubular member 23. A sealing element 25 is disposed between the inner wall of aperture 4b and the outer surface of tubular member 23.

On tubular member 23, bearing 2 is mounted and pulley 1 is mounted on bearing 2. Electromagnet 9 associating with pulley 1 is fixedly supported by a bracket 26 secured to flange member 21 by retainer ring 27.

Armature plate 7 is mounted on the extended end of drive shaft 5 similar to the known arrangement.

Figure 5:
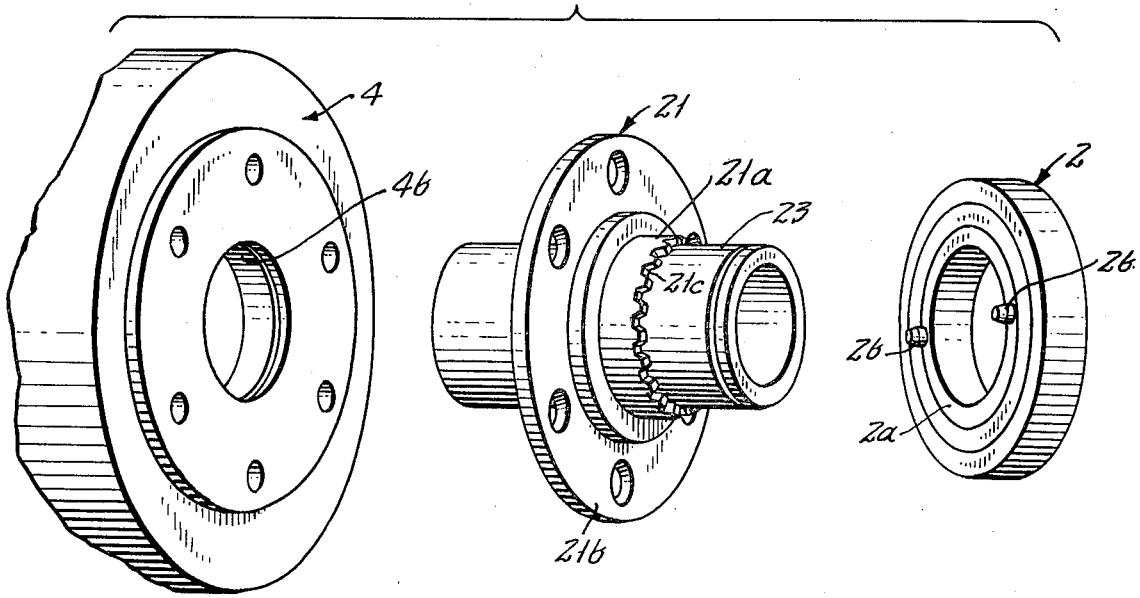
FIG. 5 is a perspective view of disassembled several parts of the embodiment shown in FIG. 4.

Referring to FIG. 5 in addition to FIG. 4, cylindrical portion 21a is formed with a plurality of depressions 21a in its axial end surface. While the inner ring 2a of bearing 2 is provided with axial projections 2b on the axial end surface opposing the axial end of cylindrical portion 21a.

Figure 1:
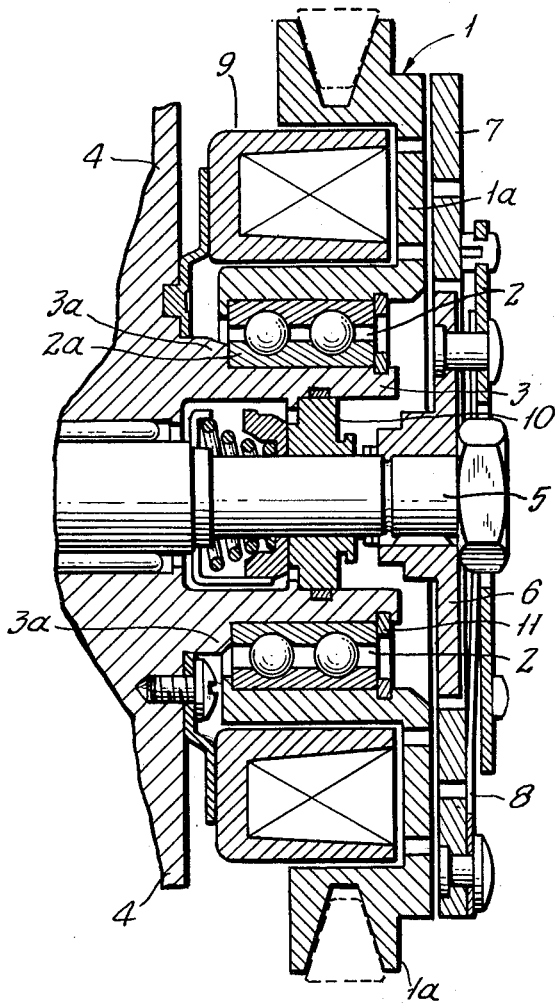
FIG. 1 is a sectional view of a known electromagnetic clutch.
Figure 2:
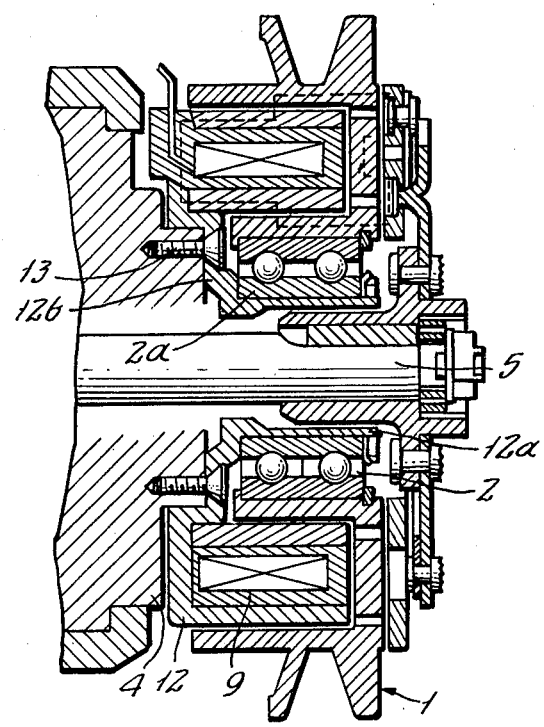
FIG. 2 is a sectional view of another known electromagnetic clutch.
Figure 3:
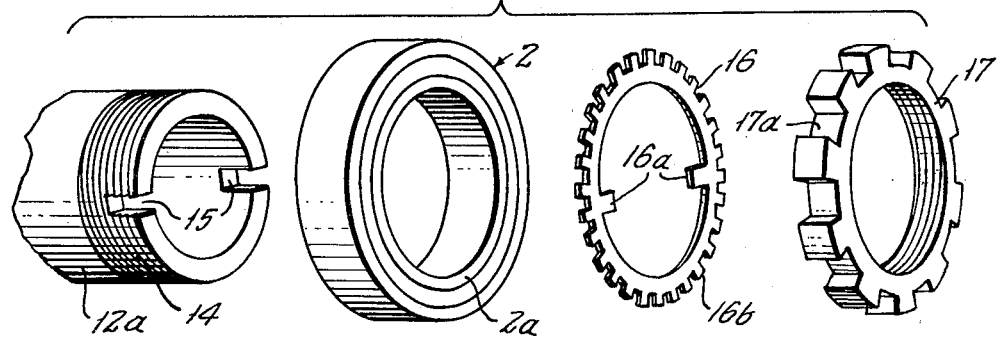
FIG. 3 is a perspective view of several parts disassembled in the clutch shown in FIG. 2.

Therefore, when inner ring 2a is held between the axial end surface of cylindrical portion 21a and retainer ring or snap ring 10 similar to the known arrangement in FIG. 1, axial projections 2b engage with axial depressions 21c to securely prevent inner ring 2a from rotating.

According to the embodiment, since tubular member 23 is not formed integral with compressor housing 4, a tube of rigid material such as steel can be used. Furthermore, since tubular member 23 is supported by compressor housing 4 and flange member 21, it is strong enough in mechanical strength to resist the tension of belt means wound on pulley 1 even if the wall thickness of tubular member 23 is made thin. Therefore, the diameter of pulley 1 is reduced.

Furthermore, the rotation of inner ring 2a of bearing 2 is prevented by a simple construction, or the engagement of axial projections 2b formed on the axial end surface of the inner ring with axial depressions 21c formed in the axial end surface of cylindrical portion 21a of flange member 21.

Therefore, the assembling operation is simplified because closely fitting operation is not required.

FIG. 6 shows a modification in which cylindrical portion 21a is provided with an axial projection 21d on the axial end surface. While, the inner ring 2a of bearing 2 is provided with an axial projection 2c. After bearing 2 is mounted on tubular member 23, with axial projections engaging with one another to prevent inner ring 2a from rotating.

Referring to FIG. 7, in a modification shown therein, inner ring 2a is provided with a plurality of radial projections 2d like a gear, which engage with depressions 21c of cylindrical portion 21 as shown in FIG. 5.

FIG. 8 shows another embodiment which is similar to the previous embodiment except that tubular member 23' is short and is not fitted into aperture 4b' of housing. In this arrangement, the assembling operation is easier, in comparison with the previous embodiment. A sealing element 28 is disposed between front surface 4a of housing 4 and flange portion 21b.

It will be easily understood that this invention may be applied on not only compressor but also the other devices having a drive shaft.

This invention has been described in detail in connection with preferred embodiments, but these are merely for example only and the invention is not restricted thereto. It will be easily understood by those skilled in the art that the other variations and modifications can be easily made within the scope of this invention.

What is claimed is:

1. In a device having a housing, a drive shaft extending out of, and rotatably mounted on, the housing, a cantilever bearing support attached to said housing, an electromagnetic clutch including a pulley member rotatably supported on said bearing support by first bearing means, an electromagnet fixedly supported on said bearing support and disposed within an annular cavity of said pulley member, an electromagnetic armature plate elastically connected to said drive shaft, and axial stopper means secured to said bearing support for preventing said bearing means from axial movement, the improvement which comprises said housing being made of aluminum alloy, said bearing support including a tubular member of steel coaxial with said drive shaft and a separate flange member having a flange portion secured to the front surface of said housing and a cylindrical portion whose inner surface is affixed to an outer surface of said tubular member, said bearing means disposed between an end surface of said cylindrical portion and said axial stopper means, and an end surface of said cylindrical portion opposed to said flange portion and an end surface of an inner ring of said bearing means being provided with interlocking means to prevent rotation of said inner ring of said bearing means relative to said bearing support.

2. A device as claimed in claim 1, wherein an axial end portion of said tubular member is fitted into an aperture in said housing, and a second bearing means is disposed within said axial end portion of said tubular member to rotatably support said drive shaft.

3. A device as claimed in claim 2, which further comprises sealing means disposed between an outer surface of said tubular member and an inner wall of said aperture.

4. A device as claimed in claim 1, which further comprises sealing means disposed between contacting surfaces of said housing and an axial end surface of said flange portion.

5. A device as claimed in claim 2, which further comprises a shaft seal assembly assembled on said drive shaft within said tubular member.

6. A device as claimed in claim 1, wherein said interlocking means comprises at least one pair of axial projections formed on the end surface of said cylindrical portion and the end surface of said inner ring of said bearing means.

7. A device as claimed in claim 1, wherein said interlocking means comprises a plurality of projections formed on one of the end surface of said cylindrical portion or the opposing axial end surface of said inner ring of said bearing means, and at least one mating depression formed on the other.

8. In a device with an electromagnetic clutch including the device having a housing and a drive shaft extending out of, and rotatably mounted on, the housing, a cantilevered bearing support connected to said housing and surrounding said drive shaft, and said electromagnetic clutch having a pulley rotatably supported on said bearing support by first bearing means, an electromagnet associated with said pulley member and an electromagnetic armature plate secured on to said drive shaft, the improvement which comprises said bearing support comprising a sleeve member with a radial flange which is secured onto the front surface of said housing, said sleeve member being provided with a shoulder portion, said bearing means mounted on the forward end portion of said shoulder of said sleeve member, axial stopper means secured on to said sleeve member to prevent said bearing means from moving axially in cooperating with said shoulder, and interlocking means between said shoulder and the inner ring of said first bearing means to prevent the relative rotation of said inner ring.

* * * * *

UNITED STATES PATENT AND TRADEMARK OFFICE
CERTIFICATE OF CORRECTION

PATENT NO. : 4,425,520
DATED : January 10, 1984
INVENTOR(S) : Masaharu Hiraga

It is certified that error appears in the above—identified patent and that said Letters Patent is hereby corrected as shown below:

IN THE CLAIMS

Claim 8 should be deleted from the Letters Patent.

On the title page, "8 Claims, 8 Drawing Figures" should read -- 7 Claims, 8 Drawing Figures --.

Signed and Sealed this

Tenth Day of December 1985

[SEAL]

Attest:

DONALD J. QUIGG

Attesting Officer    Commissioner of Patents and Trademarks